UNITED STATES PATENT OFFICE.

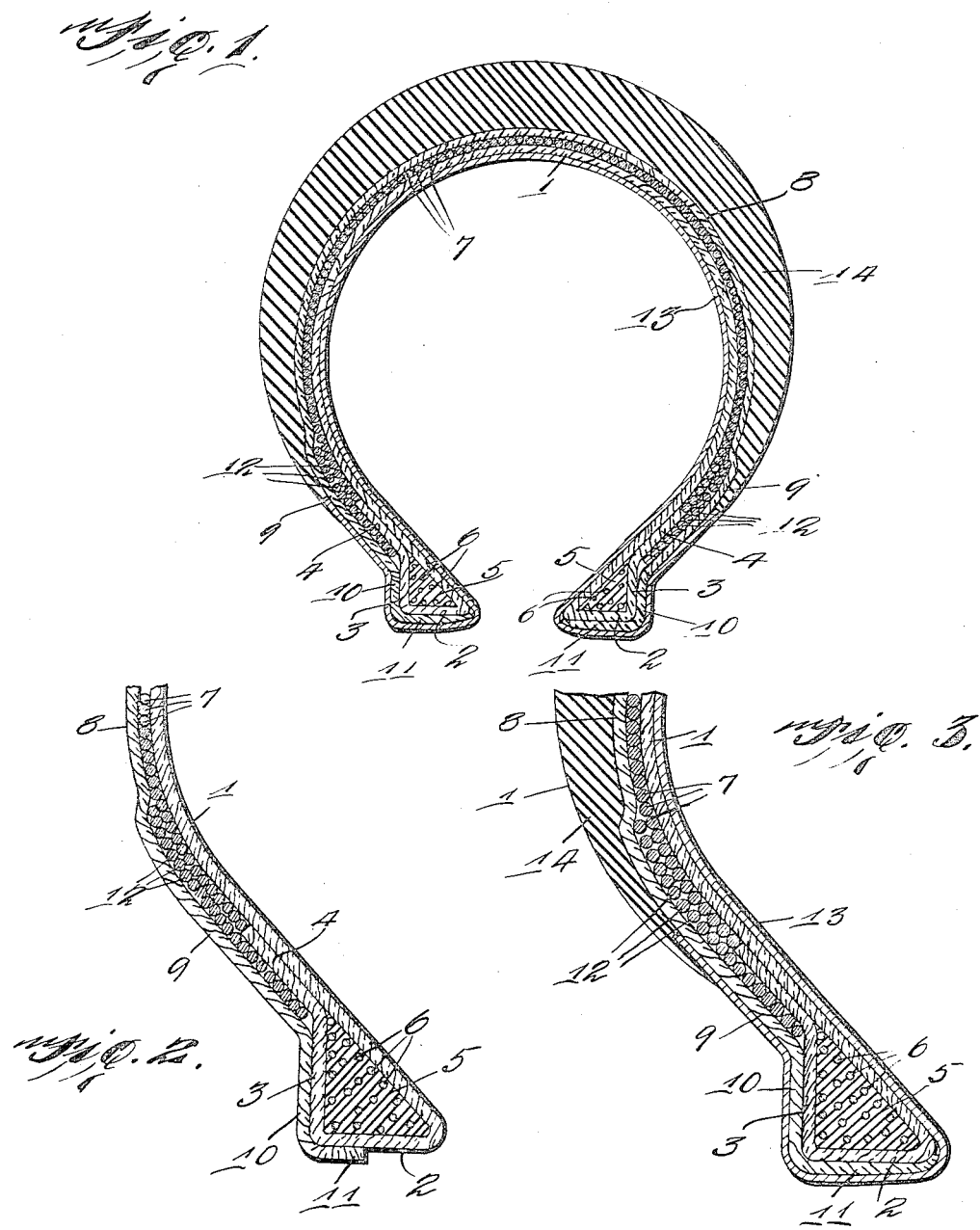

CHARLES L. ARCHER, OF MINNEAPOLIS, MINNESOTA.

CORD TIRE.

1,243,576.　　　　Specification of Letters Patent.　　Patented Oct. 16, 1917.

Application filed November 6, 1916. Serial No. 129,828.

*To all whom it may concern:*

Be it known that I, CHARLES L. ARCHER, a citizen of the United States of America, residing at Minneapolis, in the county of Hennepin and State of Minnesota, have invented certain new and useful Improvements in Cord Tires, of which the following is a specification, reference being had therein to the accompanying drawing.

This invention relates to a cord tire and has for its principal object the production of a simple and efficient reinforcing means at that point on the tire where the strain is imparted thereto by the rim, and where ordinarily the rim cuts into and weakens the tire.

Another object of this invention is the production of a cord tire wherein a reinforcing ply of longitudinally-extending cords are positioned adjacent each heel of the tire so as to resist the tendency of the rim to cut into and weaken the tire adjacent its heels when the tire is carried upon a rim.

A still further object of this invention is the production of a cord tire wherein the outer transverse cords have their end portions stretched to fit upon the end of each heel, thereby taking out the resiliency of the cords and in this manner presenting a comparatively firm body for the tire.

A still further object of this invention is the production of a cord tire wherein the inner transverse cords are looped to provide heel portions, while a longitudinally-extending interposed ply of cords will engage the ends of the inner transverse ply projecting beyond the heel, thereby presenting a comparatively even surface upon which the reinforcing ply of longitudinally-extending cords are positioned.

With these and other objects in view, this invention consists of certain combinations, constructions and arrangements of parts as will be hereinafter full described and claimed.

In the drawings:

Figure 1 is a transverse sectional view through a cord tire constructed in accordance with this invention.

Fig. 2 is an enlarged transverse sectional view through one side of the cord construction, illustrating the appearance of the outer transverse ply prior to the stretching of the ends thereof.

Fig. 3 is an enlarged fragmentary transverse section through a portion of the complete tire, showing the ends of the outer transverse cords in a stretched condition and illustrating the entire tire in an assembled condition.

Referring to the accompanying drawing by numerals, it will be seen that 1 comprises the inner transversely-extending cords which are looped over as shown at 2 to provide the heels of the tire when the entire structure is assembled. The portions 3 extending from the looped-over portions 2 of the cords 1 terminate in the end-portions 4 which fit upon the main body portions of the cords 1 whereby the heels will be entirely closed. These heels 2 may be filled with any suitable filling means 5 through which may extend reinforcing strands 6. A disclosure of the filling construction of these heels 2 is made to illustrate the fact that the heels are solidly filled in although, of course, it is obvious that any suitable material or structures may be employed to accomplish this purpose.

The longitudinally-extending cords 7 are positioned upon the inner transversely-extending cords 1 as clearly shown in Fig. 1, while a plurality of these cords 7 fit upon the extreme ends of the end-portions 4 of the inner transversely-extending cords 1. Thus it will be seen that the end-portions 4 of the inner transversely-extending cords 1 and the longitudinally-extending cords 7 present a substantially even outer surface upon which the remaining structures of this tire are positioned.

The outer transversely-extending cords 8 are positioned upon the outer surfaces of the longitudinally-extending cords 1, and these outer transversely-extending cords 8 extend at right angles to the longitudinally-extending cords 7 and in the same general construction as the body portions of the inner transversely-extending cords 1. These outer transversely-extending cords 8 are bulged outwardly as shown at 9 for purposes to be hereinafter set forth, and then fit snugly upon the portions 3 of the heels 2 as shown at 10, while the end-portions 11 of the outer transversely-extending cords 8 fit upon the outer ends of the heels 2 as shown in Fig. 2. It will be seen by referring particularly to Fig. 2 that the end-portions 11 of the outer transversely-extending cords are cut so as to extend originally approximately only about one-half of the breadth of the heels 2 when the end-portions 11 are first positioned upon these heels. During the course of the construction of the cord tire, while the same is within the mold, the end-portions 11 of the outer transversely-extending cords 8 are stretched so as to extend entirely across the entire width of the heels 2 as shown clearly in Figs. 1 and 3. While in this condition it is, of course, obvious that the end portions 11 of the outer transversely-extending cords 8 will be retained by vulcanizing or rubberizing or any other suitable manner upon the outer ends of the heels 2. By this stretching of the end-portions 11 it is obvious that a very simple and inexpensive means is provided for eliminating resiliency in the cord tire and in this manner causing a very firm body portion to be constructed.

The reinforcing ply of longitudinally-extending cords 12 are interposed within the bulged portion 9 and the outer transversely-extending cords 8 so as to fit upon a plurality of the longitudinally-extending cords 7, and also upon the end-portions 4 of the inner transversely-extending cords 1. By the interposition of this reinforcing ply of longitudinally-extending cords 12 it will be seen that a very simple and efficient reinforcing means is provided upon each side of the tire adjacent the heels so as to construct a structure having a reinforcement at each point where the strain of the rim is imparted to the tire. In the tires now in use, it is well known that the ordinary damage imparted to the tires by what is known as "rim cuts" takes place at points adjacent the heels. This is because at this point the tires are the thinnest and, consequently, great damage is imparted to the tires due to the excessive strain brought to bear thereon. The interposition of the interposed ply of longitudinally-extending cords 12 will prevent damage by rim cutting at this point since the points of flexibility will be nearer to the heels although the points upon which the strain of the rim is imparted to the tire will be so reinforced as to prevent the tire from being cut at these points.

It is obvious that when the cords have been positioned upon each other and the end-portions 11 of the outer transversely-extending cords 8 have been stretched as hereinbefore set forth, the cords may be rubberized or otherwise secured together so as to present a substantially one-piece construction if so desired.

After this action has taken place, it is obvious that a lining sheet 13 may be positioned so as to rest upon the inner transversely-extending cords 1 while this sheet may have its side edges looped over the heels so as to rest upon the bulged portions 9 of the outer transversely-extending cords 8. The outer casing 14 may then be positioned upon the outer transversely-extending cords 8 so as to constitute a complete cord tire which after being assembled as above described is in condition for use.

From the foregoing description it will be seen that a very simple and efficient cord tire is provided which is formed so as to cause all of the cords to fit firmly upon each other when in an assembled position since the resiliency of the cords has been removed by the stretching of the end-portions of the outer transversely-extending cords, thereby presenting a firm body for the cord tire. It is further obvious from the foregoing description that the ordinary damage imparted to pneumatic tires due to rim cuts is prevented from taking place upon this cord tire since the reinforcing ply of interposed longitudinally-extending cords will present such a reinforcement for the tire as to prevent injury thereto due to rim cuts.

What is claimed is:—

1. In a tire of the class described, the combination of inner transversely-extending cords, longitudinally-extending cords fitting upon said inner transversely-extending cords, outer transversely-extending cords positioned upon said longitudinally-extending cords, heels formed upon said tire, and a ply of longitudinally-extending reinforcing cords interposed within said outer transversely-extending cords adjacent each heel so as to reinforce the tire at the points where the strain imparted by the rim to the tire takes place.

2. In a tire of the class described, the combination of inner and outer cords, a ply of cords interposed between said inner and outer cords, said inner and outer cords extending across the central axis of said last-mentioned ply of cords, heels carried upon said tire, and an interposed ply of cords carried adjacent each heel between said outer cords and said last-mentioned cords thereby reinforcing the tire at the points where the strain is imparted thereto by a rim.

3. In a tire of the class described, the combination of inner and outer plies of cords, a ply of cords interposed between said inner and outer ply of cords, heels formed upon said tire, and a ply of longitudinally-extending cords interposed between said outer ply of cords and said interposed ply of cords adjacent said heels thereby constituting a reinforcement for said tire at the point where a rim imparts its strain to the tire.

4. In a tire of the class described, the combination of a plurality of inner transversely-extending cords, said inner transversely-extending cords having looped-over portions forming heels, said looped-over portions having end-portions fitting upon the body-portions of said transversely-extending cords, means for filling said heels, longitudinally-extending cords fitting upon said transversely-extending cords, a longitudinally-extending cord upon each side of the tire abutting against the extreme ends of said end-portions of said looped-over portions of said transversely-extending cords thereby presenting a comparatively even outer surface at the junction of said longitudinally-extending cords and said end-portions, outer transversely-extending cords fitting upon said longitudinally-extending cords, and said outer transversely-extending cords engaging said heels.

5. In a tire of the class described, the combination of a plurality of inner transversely-extending cords, said inner transversely-extending cords having looped-over portions forming heels, said looped-over portions having end-portions fitting upon the body-portions of said transversely-extending cords, means for filling said heels, longitudinally-extending cords fitting upon said transversely-extending cords, a longitudinally-extending cord upon each side of the tire abutting against the extreme ends of said end-portions of said looped-over portions of said transversely-extending cords thereby presenting a comparatively even outer surface at the junction of said longitudinaly-extending cords and said end-portions, outer transversely-extending cords fitting upon said longitudinally-extending cords, said outer transversely-extending cords engaging said heels, and longitudinally-extending cords interposed within said transversely-extending cords adjacent said heels whereby said last-mentioned longitudinally-extending cords will bear upon said end-portions of said first-mentioned longitudinally-extending cords so as to form a reinforcing structure adjacent said heels adapted to resist the strain imparted to a tire by a rim.

6. In a tire of the class described, the combination of a plurality of inner transversely-extending cords, said inner transversely-extending cords having looped-over portions forming heels, said looped-over portions having end-portions fitting upon the body-portions of said transversely-extending cords, means for filling said heels, longitudinally-extending cords fitting upon said transversely-extending cords, a longitudinally-extending cord upon each side of the tire abutting against the extreme ends of said end-portions of said looped-over portions of said transversely-extending cords thereby presenting a comparatively even outer surface at the junction of said longitudinally-extending cords and said end-portions, outer transversely-extending cords fitting upon said longitudinally-extending cords, said outer transversely-extending cords engaging said heels, said outer transversely-extending cords being bulged outwardly adjacent said heels, longitudinally-extending reinforcing cords positioned within said outwardly-bulged portions whereby said reinforced cords will fit upon said first-mentioned longitudinally-extending cords and upon said end-portions so as to present a reinforcement for the tire at the points where a rim imparts strain to the tire, the ends of said outer transversely-extending cords being stretched across the entire breadth of said heels whereby resiliency is removed from said cords and a firm body is presented.

7. In a tire of the class described, the combination of inner and outer plies of cords, a ply of cords interposed between said inner and outer plies of cords, the cords of said first-mentioned plies extending across the central axis of said last-mentioned ply of cords, heels carried upon said tire, and a ply of longitudinally extending cords interposed within said outer ply of cords adjacent each heel for reinforcing said tire at the points where strain is imparted thereto by a rim.

8. In a tire of the class described, the combination of inner and outer plies of cords, a ply of cords interposed between said inner and outer plies of cords, and a ply of cords interposed within said outer ply of cords adjacent each heel for reinforcing said tire at the points where strain is imparted thereto by a rim.

In testimony whereof I hereunto affix my signature.

CHARLES L. ARCHER.